Jan. 5, 1960   G. L. MIKSIT ET AL   2,920,244
INSTRUMENT MOUNTING ASSEMBLY

Filed Nov. 3, 1955   2 Sheets-Sheet 1

INVENTORS
JAMES E. JONES
GEORGE L. MIKSIT
BY William R. Nolte
AGENT

Jan. 5, 1960　　　　G. L. MIKSIT ET AL　　　　2,920,244
INSTRUMENT MOUNTING ASSEMBLY
Filed Nov. 3, 1955　　　　　　　　　　　　2 Sheets-Sheet 2

INVENTORS
JAMES E. JONES
GEORGE L. MIKSIT
BY William R. Nolte
AGENT

United States Patent Office 2,920,244
Patented Jan. 5, 1960

2,920,244

INSTRUMENT MOUNTING ASSEMBLY

George L. Miksit, Sharon Hill, and James E. Jones, Lansdowne, Pa., assignors to Burroughs Corporation, Detroit, Mich., a corporation of Michigan Application November 3, 1955, Serial No. 544,755

2 Claims. (Cl. 317—99)

The present invention relates to testing apparatus and more particularly to an oscilloscope mounting as an assembled part of a rack for testing electrical components.

In racks mounting electrical equipment for oscilloscope test purposes it has heretofore been the practice to employ mobile racks by means of which the units to be tested are either wheeled to a located oscilloscope, or if the rack is stationary the oscilloscope is brought to the rack. In both instances the oscilloscope is stationed beside the rack with the interconnecting conductors spread from one unit to the other and generally in the way of the user or others. Also with the oscilloscope at the side of the rack it is difficult for the user to manipulate the equipment while at the same time taking accurate readings from the scope screen.

An object of the invention is to provide an improved assembly for mounting an oscilloscope.

Another object is to provide a mounting for an oscilloscope wherein all electrical conductors between the oscilloscope and components being tested are compactly kept within the confines of the testing unit.

Another object is to provide an oscilloscope assembly wherein electrical components and an oscilloscope are arranged for common viewing in front of the user.

A further object is to provide means for mounting an oscilloscope in a test rack wherein the scope screen can be viewed laterally from the test rack position or from a position thereabove, and to provide other improvements as will hereinafter appear.

In the accompanying drawings Fig. 1 represents a perspective of an oscilloscope mounting assembly embodying one form of the present invention, the oscilloscope being omitted for better illustration;

Figure 1:
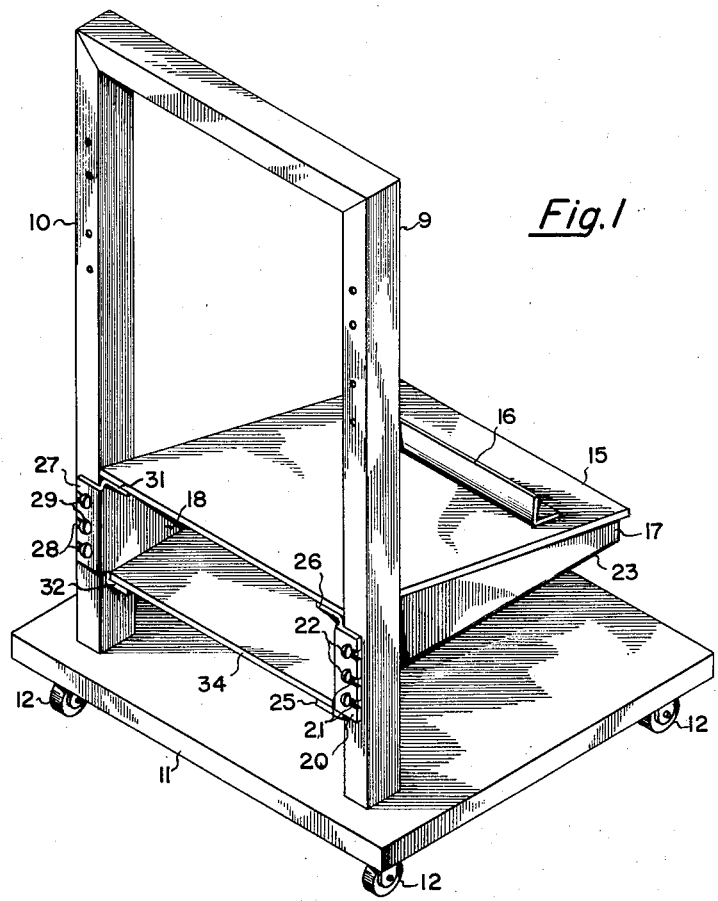
Figure 2:
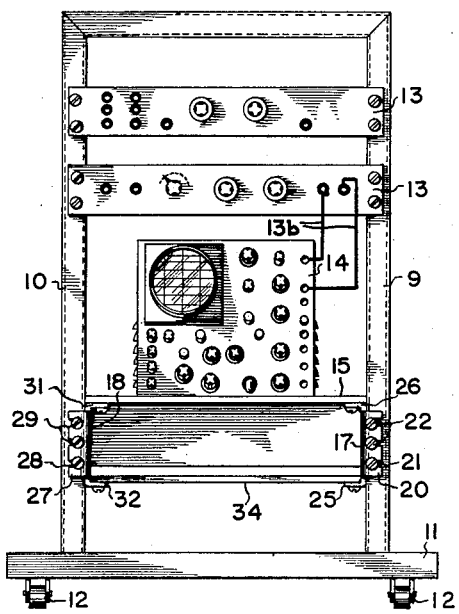
Fig. 2 represents a front elevation of the mounting assembly showing the oscilloscope and test components in place on the rack.
Figure 3:
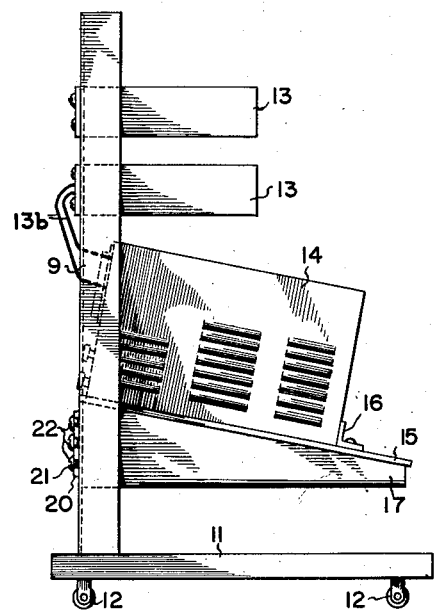
Fig. 3 represents a side elevation of the mounting assembly.
Figure 5:
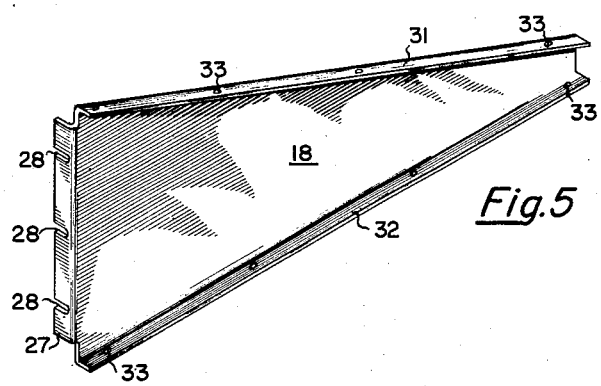
Fig. 5 represents a perspective of the left side bracket of the mounting.
Figure 4:
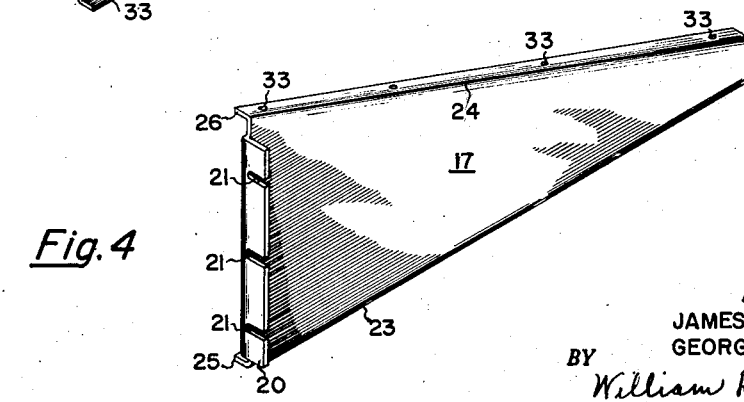
Fig. 4 represents a perspective of the right hand side bracket of the mounting.

Referring to the drawings, a rack of the type used in the testing of electrical components is shown comprising two channel standards 9 and 10 vertically spaced in parallel relation from a platform 11 which is supported upon rollers 12 so that the rack can be readily moved from one test location to another. The standards 10 may be provided with vertically spaced holes, horizontally aligned in pairs, for the attachment of panels 13 which carry adjusting knobs for electrical components and corresponding test connections. These panels 13 are shown as mounted across the front of the rack in convenient reach of a user but providing a space below for viewing an oscilloscope 14 while manipulating the component controls. Electrical conductors 13b connect the electrical components carried by panels 13 with the oscilloscope 14.

For mounting the oscilloscope 14, a shelf 15 is provided having an angle iron stop 16 transversely fixed thereto adjacent one shelf end to position the face of the oscilloscope for convenient viewing by the users in testing position. Preferably as here shown the shelf 15 is tilted rearwardly for better viewing purposes but as will be pointed out the shelf mounting may be in a horizontal plane for viewing the oscilloscope in a vertical plane.

In order to support the shelf 15 two side frames in the form of truncated plates 17 and 18 are provided, one for attachment to the right side of the rack and the other for attachment to the left side of the rack. The plate 17 is formed at the major end with a bracket 20 disposed at right angles to the plate 17 in order to overlie the outer face of the standard 9 in attached relation through the medium of slots 21 which respectively receive bolts 22 or other fastening means clamping the bracket to the standard. The bottom edge 23 of the plate 17 extends horizontally from the bracket 20, while the top edge 24 of the plate 17 lies in a plane at an acute angle to the bracket 20 and converging towards the edge 23. This edge 23 is provided with a substantially continuous flange 25 at right angles to the plate 17 but disposed in the opposite direction to the bracket 20. The top edge 24 is also formed with a substantially continuous flange 26 at right angles to the plate 17 and also disposed in the opposite direction to that of the bracket 20.

The plate 18 is a mirror-imaged duplicate of the plate 17 with its bracket 27 disposed oppositely to the bracket 20 to overlie the standard 10 and be fixed thereto by slots 28 and bolts 29 as explained for the bracket 20. Also the plate 18 has upper and lower flanges 31 and 32 juxtaposed respectively to the flanges 26 and 25 of the plate 17. Thus the flange 31 lies in the same generally horizontal plane as the flange 26, and the flange 32 lies in the same horizontal plane as the flange 25. The two top flanges 31 and 26 provide required side supports for the shelf 15 which is bolted or otherwise made fast by spaced holes 33 in the respective flanges. The two bottom flanges 32 and 25 may be used, if necessary, to support a supplemental shelf 34 which is accessible through the front of the rack and can be used for storing test leads or other equipment.

With the shelf 15 fixed in place the oscilloscope 14 can be placed thereon in an inclined position seated against the stop 16, thereby presenting the scope screen at a desirable viewing angle. While this angular mounting is preferred it should be noted that the side plates 17 and 18 can be inverted and thus bring the horizontal flanges uppermost to form a level horizontal supporting surface.

It will now be apparent that a complete novel oscilloscope assembly has been devised wherein electrical components mounted in a rack for test purposes and an oscilloscope are located in front of the user and simultaneously operated and viewed. Also all electrical conductors, between the oscilloscope and the instruments being tested, are kept within the confines of the rack instead of, as heretofore, straggling in the space about an adjacent oscilloscope. Furthermore the mounting of the oscilloscope can be changed from an inclined one to a level one so that optionally the user can view an inclined screen or a vertical plane screen. Obviously other test instruments may be mounted than the oscilloscope, if desired.

What is claimed is:

1. A test rack assembly including, in combination, a pair of spaced apart upright parallel extending standards having similar portions of their respective lengths arranged to support one or more electrical components for testing purposes, a pair of side supporting frames of like dimension and so shaped with respect to one another that each constitutes a mirror image of the other, each side frame assuming generally the shape of a right triangle having one of the two sides thereof defining the right angle constituting the front side of the frame, said front side of each frame having a lateral flange projecting perpendicular to the plane thereof and shaped to cooperate with fastening means for removably securing the frame to one or the other of the two upright standards of the rack assembly, the remaining two sides of the frames each having a lateral flange projecting perpendicularly to the plane of the frame in the same direction to one another but opposite to that of the flange of the front side of the frame, means for detachably fastening the front side flanges of the two frames individually to each of said upright standards so that the frames project rearwardly thereof in side-by-side relationship to form a shelf upon which a testing unit or the like may be supported, the mirror image characteristic of the two frames being such that when the front side flanges thereof are fastened to the upright standards in one side-by-side relationship the flanges of the remaining sides of the frames defining the right angles thereof cooperate with one another to provide a horizontal shelf for supporting a testing unit and that when the two frames are intercharged one with the other and inverted and have their front flanges again fastened to the upright standards they assume a second side-by-side relationship wherein the flanges of the hypotenuse sides of the frames cooperate with one another to provide an inclined shelf for supporting a testing unit.

2. A test rack assembly including, in combination, a pair of spaced apart upright parallel extending standards having similar portions of their respective lengths arranged to support one or more electrical components for testing purposes, a pair of side supporting frames of like dimension and so shaped with respect to one another that each constitutes a mirror image of the other, each side frame assuming generally the shape of a right triangle having one of the two sides thereof defining the right angle constituting the front side of the frame, said front side of each frame being shaped to cooperate with fastening means for removably securing the frame to one or the other of the two upright standards of the rack assembly, the remaining two sides of the frames each having a lateral flange projecting perpendicularly to the plane of the frame in the same direction to one another, means for detachably fastening the front sides of the two frames individually to each of said upright standards so that the frames project rearwardly thereof in side-by-side relationship to form a shelf upon which a testing unit or the like may be supported, the mirror image characteristic of the two frames being such that when the front sides thereof are fastened to the upright standards in one side-by-side relationship the flanges of the remaining sides of the frames defining the right angles thereof cooperate with one another to provide a horizontal shelf for supporting a testing unit and that when the two frames are intercharged one with the other and inverted and have their sides again fastened to the upright standards they assume a second side-by-side relationship wherein the flanges of the hypotenuse sides of the frames cooperate with one another to provide an inclined shelf for supporting a testing unit.

References Cited in the file of this patent

UNITED STATES PATENTS

| Re. 12,140 | Stahmer | Aug. 4, 1903 |
| 404,396 | Fuller | June 4, 1889 |
| 1,177,365 | Spalding | Mar. 28, 1916 |
| 1,300,229 | Welt et al. | Apr. 8, 1919 |
| 1,424,380 | Richards | Aug. 1, 1922 |
| 1,700,976 | Bulman | Feb. 5, 1929 |
| 2,241,181 | Bushnell | May 6, 1941 |
| 2,429,241 | Schulinder | Oct. 21, 1947 |
| 2,671,176 | Landaver | Mar. 2, 1954 |

OTHER REFERENCES

Publication, "Instruments," November 1945, pp. 74–76, vol. 18.
Tektronix, (publication), page 10, January 1950.
Publication, "Electronics," page 114, August 1955.